United States Patent
Zhang et al.

(10) Patent No.: US 10,779,262 B2
(45) Date of Patent: Sep. 15, 2020

(54) COMMUNICATION METHOD AND APPARATUS

(71) Applicant: HUAWEI TECHNOLOGIES CO., LTD., Shenzhen, Guangdong (CN)

(72) Inventors: Wei Zhang, Shanghai (CN); Jinfang Zhang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/023,332

(22) Filed: Jun. 29, 2018

(65) Prior Publication Data

US 2018/0310277 A1 Oct. 25, 2018

Related U.S. Application Data

(63) Continuation of application No. PCT/CN2016/106649, filed on Nov. 21, 2016.

(30) Foreign Application Priority Data

Dec. 30, 2015 (CN) .......................... 2015 1 1027384

(51) Int. Cl.
*H04W 72/00* (2009.01)
*H04W 48/10* (2009.01)
(Continued)

(52) U.S. Cl.
CPC ......... *H04W 72/005* (2013.01); *H04W 48/10* (2013.01); *H04W 48/18* (2013.01);
(Continued)

(58) Field of Classification Search
CPC .... H04W 72/005; H04W 48/10; H04W 48/18
See application file for complete search history.

(56) References Cited

U.S. PATENT DOCUMENTS

| 6,028,851 A * | 2/2000 | Persson ................ H04B 7/216 |
| 2005/0083899 A1* | 4/2005 | Babbar ................ H04B 7/216 |

(Continued)

FOREIGN PATENT DOCUMENTS

| CN | 1852549 A | 10/2006 |
| CN | 101163091 A | 4/2008 |

(Continued)

OTHER PUBLICATIONS

International Search Report dated Sep. 2, 2017 in corresponding International Patent Application No. PCT/CN2016/106649.

(Continued)

*Primary Examiner* — Ronald B Abelson
(74) *Attorney, Agent, or Firm* — Womble Bond Dickinson (US) LLP

(57) ABSTRACT

The present application discloses a communication method and an apparatus. The method includes: obtaining, by a terminal device, information about an access technology corresponding to a first service; receiving, by the terminal device, information about an access technology and resource information corresponding to the access technology that are broadcast by a network device; determining, by the terminal device based on the obtained information about the access technology corresponding to the first service, and the information about the access technology and the resource information corresponding to the access technology that are broadcast by the network device, a first resource corresponding to the first service; and sending, by the terminal device, an access request to the network device by using the first resource.

14 Claims, 8 Drawing Sheets

(51) Int. Cl.
  *H04W 48/18*   (2009.01)
  *H04W 72/02*   (2009.01)
  *H04L 29/08*   (2006.01)

(52) U.S. Cl.
  CPC ............ *H04L 67/12* (2013.01); *H04W 72/00* (2013.01); *H04W 72/02* (2013.01)

(56) References Cited

U.S. PATENT DOCUMENTS

| | | | |
|---|---|---|---|
| 2007/0217349 | A1 | 9/2007 | Fodor et al. |
| 2008/0176552 | A1* | 7/2008 | Hamano .................. H04Q 7/20 |
| 2009/0219946 | A1 | 9/2009 | Liu et al. |
| 2011/0151924 | A1 | 6/2011 | Miller |
| 2012/0064902 | A1 | 3/2012 | Kronander et al. |
| 2012/0295619 | A1 | 11/2012 | Kazmi et al. |
| 2014/0355521 | A1* | 12/2014 | Choi ..................... H04W 48/20 |
| 2016/0066357 | A1* | 3/2016 | Goldhamer ......... H04W 76/023 |

FOREIGN PATENT DOCUMENTS

| | | |
|---|---|---|
| CN | 101635988 A | 1/2010 |
| CN | 101810037 A | 8/2010 |
| CN | 103098512 A | 5/2013 |
| CN | 104022935 A | 9/2014 |
| CN | 104936149 A | 9/2015 |
| WO | 2010010009 A2 | 1/2010 |

OTHER PUBLICATIONS

Extended European Search Report, dated Sep. 11, 2018, in European Application No. 16880812.9 (10 pp.).

International Search Report, dated Feb. 9, 2017, in International Application No. PCT/CN2016/106649 (5 pp.).

\* cited by examiner

COMMUNICATION METHOD AND APPARATUS

CROSS-REFERENCE TO RELATED APPLICATIONS

This application is a continuation of International Application No. PCT/CN2016/106649, filed on Nov. 21, 2016, which claims priority to Chinese Patent Application No. 201511027384.7, filed on Dec. 30, 2015. The disclosures of the aforementioned applications are hereby incorporated by reference in their entireties.

TECHNICAL FIELD

Embodiments of the present application relate to the communications field, and in particular, to a communication method and an apparatus.

BACKGROUND

With development of information technologies and communications technologies, various services continuously spring up, for example, a high-throughput service represented by a video service, a service with massive Internet of Things (IoT for short) links represented by a smart reading meter and a health service, and a delay-sensitive service represented by unmanned driving and Internet of Vehicles. Features and quality of service (QoS for short) requirements of the services are greatly different. Correspondingly, processing of service data in a communications network is also greatly different. To support different services, a network slice for providing service support for the service is deployed in the network, where the network slice includes various required function examples and corresponding processing resources and/or transmission resources. The network resource may be a virtual network consisting of a series of function entities and resources.

Different access technologies are used for different services. For example, various existing access technologies support an IoT service, for example, an NB-GSM (narrowband Global system for mobile communications), NB-M2M (narrowband machine to machine), NB-OFDM (narrowband orthogonal frequency division multiplexing), and NB-CIoT (Narrowband Cellular Internet of Things). In this case, how to implement communication when different technologies are used needs to be considered.

SUMMARY

Embodiments of the present application provide a communication method and an apparatus, so as to implement communication when different access technologies are used. Technical solutions are as follows:

According to a first aspect, an embodiment of the present application provides a communication method, and the method includes:

obtaining, by a terminal device, information about an access technology corresponding to a first service; receiving, by the terminal device, information about an access technology and resource information corresponding to the access technology that are broadcast by a network device; determining, by the terminal device based on the obtained information about the access technology corresponding to the first service, and the information about the access technology and the resource information corresponding to the access technology that are broadcast by the network device, a first resource corresponding to the first service; and sending, by the terminal device, an access request to the network device by using the first resource.

In a possible design, the resource information corresponding to the access technology includes resource information corresponding to a service supported by the access technology; and the method further includes: obtaining, by the terminal device, identity information of the first service; and matching, by the terminal device, the information about the access technology corresponding to the first service and the identity information of the first service with the information about the access technology and the resource information corresponding to the service supported by the access technology that are broadcast by the network device, to determine the first resource.

In a possible design, the terminal device obtains identity information of the first service; and the terminal device determines, based on the information about the access technology corresponding to the first service, and the information about the access technology and the resource information corresponding to the access technology that are broadcast by the network device, a resource corresponding to the access technology corresponding to the first service; receives, on the determined resource corresponding to the access technology corresponding to the first service, service identity information broadcast by the network device; and determines, as the first resource, a resource used by the network device to send the identity information of the first service.

In another possible design, the terminal device uses the first access technology to communicate with the network device on the first resource.

According to a second aspect, an embodiment of the present application provides a communication method, and the method includes:

broadcasting, by a network device, information about an access technology and resource information corresponding to the access technology; and receiving, by the network device on a first resource, an access request sent by a terminal device, where the first resource is a resource determined by the terminal device based on obtained information about an access technology corresponding to a first service, and the information about the access technology and the resource information corresponding to the access technology that are broadcast by the network device.

In another possible design, the resource information corresponding to the access technology includes resource information corresponding to a service supported by the access technology, where the first resource is a resource determined by the terminal device by matching the information about the access technology corresponding to the first service and identity information of the first service with the information about the access technology and the resource information corresponding to the service supported by the access technology that are broadcast by the network device.

In another possible design, the network device broadcasts, on a dedicated resource corresponding to the access technology, identity information of a service carried on the dedicated resource, where the first resource is a resource for sending identity information of the first service.

In another possible design, the network device communicates with the terminal device on the first resource.

In another possible design, the network device receives identity information of the first service sent by the terminal device; the network device sends information about a second resource to the terminal device; and the network device communicates with the terminal device on the second resource.

According to a third aspect, an embodiment of the present application provides a terminal device, and the terminal device includes:

a receiving unit, configured to receive information about an access technology and resource information corresponding to the access technology that are broadcast by a network device; a processing unit, configured to: obtain information about an access technology corresponding to a first service, and determine, based on the obtained information about the access technology corresponding to the first service, and the information about the access technology and the resource information corresponding to the access technology that are broadcast by the network device, a first resource corresponding to the first service; and a sending unit, configured to send an access request to the network device by using the first resource.

In another possible design, the resource information corresponding to the access technology includes resource information corresponding to a service supported by the access technology; and the processing unit is further configured to: obtain identity information of the first service; and match the information about the access technology corresponding to the first service and the identity information of the first service with the information about the access technology and the resource information corresponding to the service supported by the access technology that are broadcast by the network device, to determine the first resource.

In another possible design, the processing unit is further configured to: obtain identity information of the first service; and determine, based on the information about the access technology corresponding to the first service, and the information about the access technology and the resource information corresponding to the access technology that are broadcast by the network device, a resource corresponding to the access technology corresponding to the first service; the receiving unit is further configured to receive, on the determined resource corresponding to the access technology corresponding to the first service, service identity information broadcast by the network device; and the processing unit is configured to determine, as the first resource, a resource used, by the network device to send the identity information of the first service.

In another possible design, the sending unit is further configured to send identity information of the first service to the network device by using the first resource, and the receiving unit is further configured to receive, on the first resource, information that is about a second resource and is sent by the network device.

According to a fourth aspect, an embodiment of the present application provides a network device, and the network device includes:

a sending unit, configured to broadcast information about an access technology and resource information corresponding to the access technology; and a receiving unit, configured to receive, on a first resource, an access request sent by a terminal device, where the first resource is a resource determined by the terminal device based on obtained information about an access technology corresponding to a first service, and the information about the access technology and the resource information corresponding to the access technology that are broadcast by the network device.

In another possible design, the resource information corresponding to the access technology includes resource information corresponding to a service supported by the access technology, where the first resource is a resource determined by the terminal device by matching the information about the access technology corresponding to the first service and identity information of the first service with the information about the access technology and the resource information corresponding to the service supported by the access technology that are broadcast by the network device.

In another possible design, the sending unit is further configured to broadcast, on a dedicated resource corresponding to the access technology, identity information of a service carried on the dedicated resource, and the first resource is a resource for sending identity information of the first service.

In another possible design, the receiving unit is further configured to receive identity information of the first service sent by the terminal device, and the sending unit is further configured to send information about a second resource to the terminal device, where the second resource is used for communication between the network device and the terminal device.

In another possible design, the processing unit is configured to determine, based on a correspondence between a service and a resource, and identity information of the first service, the second resource.

According to a fifth aspect, an embodiment of the present application provides a terminal device, and the terminal device includes:

a transceiver, configured to communicate with a network device; a memory, configured to store an instruction; and a processor, configured to execute the instruction stored in the memory, so as to execute the following steps when executing the instruction: obtaining information about an access technology corresponding to a first service; receiving, by using the transceiver, information about an access technology and resource information corresponding to the access technology that are broadcast by the network device; determining, based on the obtained information about the access technology corresponding to the first service, and the information about the access technology and the resource information corresponding the access technology that are broadcast by the network device, a first resource corresponding to the first service; and instructing the transceiver to send an access request to the network device by using the first resource.

In another possible design, the first resource may be determined in another detailed manner. Specifically, reference may be made to a corresponding method embodiment, and details are not described herein.

According to a sixth aspect, an embodiment of the present application provides a network device, and the network device includes:

a transceiver, configured to communicate with a network device; a memory, configured to store an instruction; and a processor, configured to execute the instruction stored in the memory, so as to execute the following steps when executing the instruction: broadcasting information about an access technology and resource information corresponding to the access technology; and receiving, on a first resource, an access request sent by a terminal device, where the first resource is a resource determined by the terminal device based on obtained information about an access technology corresponding to the first service, and the information about the access technology and the resource information corresponding to the access technology that are broadcast by the network device.

In another possible design, the first resource may be determined in another detailed manner. Specifically, reference may be made to a corresponding method embodiment, and details are not described herein.

In this embodiment of the present application, the network device broadcasts the information about the access technology and the resource information corresponding to the access technology, so that the terminal device can receive a broadcast message, and obtain the information about the access technology and the resource information corresponding to the access technology. The terminal device determines, based on information about an access technology corresponding to a required service, a resource corresponding to the service, and accesses a network by using the resource. In this way, communication is implemented when a plurality of access technologies are used.

DESCRIPTION OF EMBODIMENTS

Figure 1:
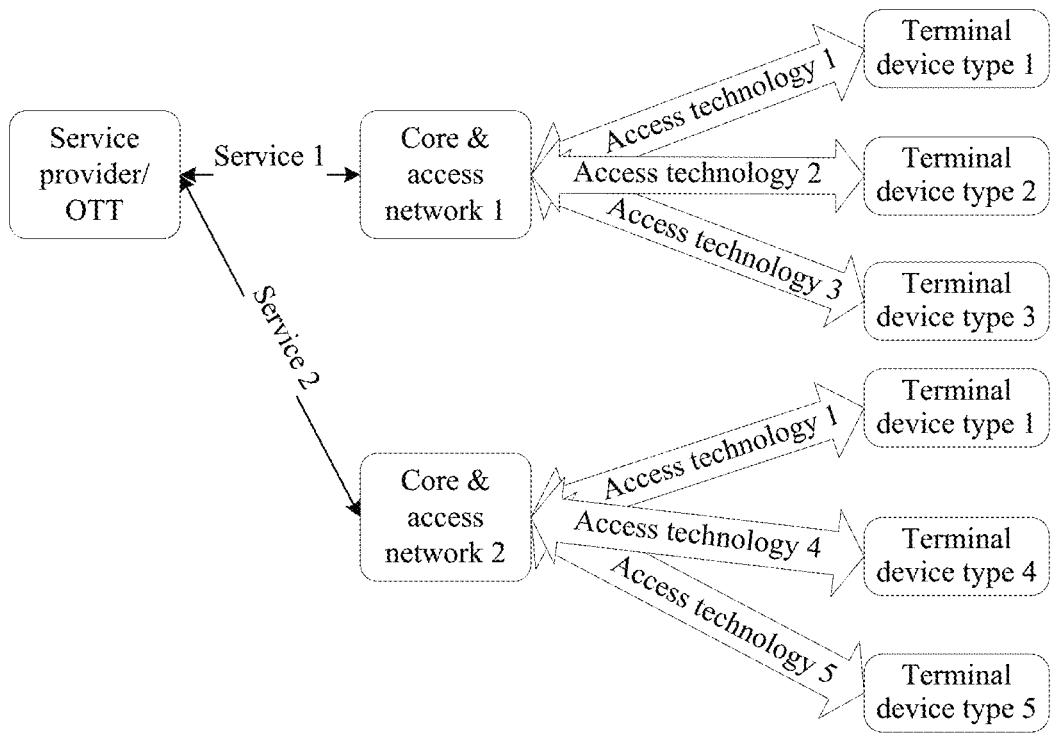
FIG. 1 is a schematic diagram of a relationship between a service and an access technology according to an embodiment of the present application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or on a network such as the Internet interacting with another system by using the signal).

In the prior art, several access modes: 2G (2nd generation), 3G (3rd generation), and 4G (4th generation) coexist. A frequency band on which each mode may be deployed on is defined in the standard for different access modes, and a specific access mode is deployed on only several designated frequency bands. When an operator deploys these access modes, the operator first selects a frequency band corresponding to a specific mode, where a different frequency band is selected for each mode, and then the operator unchangeably deploys the specific mode on the selected frequency band. When a user terminal uses one of these access modes, first, frequency bands on which the access mode may be deployed on are configured for the terminal, and then the user terminal searches on these frequency bands, after finding a corresponding mode, the terminal accesses a network.

In a future network, an operator may select different access technologies to match with requirements of different services. In addition, different stations may deploy different access technologies based on requirements of service providers and requirements of the operators. Therefore, a type and a quantity of access technologies are far greater than a type of existing modes, and different access technologies may be deployed on a same frequency band. It is difficult to standardize deployment locations of access technologies and resources corresponding to the access technologies. In addition, because access technologies deployed for different stations of different operators may be different, there is great uncertainty for deployment of access technologies and services. Defining deployment locations of the access technologies in a standard may cause a waste of resources. When the deployment locations of the access technologies are not standardized, how to implement communication when different access technologies are used needs to be considered.

The present application provides a solution, so that a user terminal may recognize an access technology corresponding to a service required by the user terminal, and use the access technology to access a network.

FIG. 1 is a schematic diagram of a relationship between a service and an access technology according to an embodiment of the present application. A relationship between a service and an access technology may be a many-to-many relationship. A plurality of access technologies may support a same service; and a same access technology may support different services. For example, in FIG. 1, in a core & access network 1, an access technology supporting a service 1 includes an access technology 1, an access technology 2, and an access technology 3. In a core & access network 2, an access technology supporting a service 2 includes the access technology 1, an access technology 4, and an access technology 5. The access technology 1 supports both the service 1 and the service 2.

In implementation of the present application, a service provider or OTT (over the top) poses a service requirement to a network operator, and the network operator selects, based on the service requirement and a characteristic of a terminal device, an access technology supporting the service. OTT is an abbreviation of "Over The Top", meaning that the Internet is used to provide various application services for a user. A service requirement usually means a corresponding QoS (quality of service) requirement of a service. A characteristic of a terminal device may mean a capability of the terminal device or a terminal device capability subscribed by a user. For example, in FIG. 2, in the core & access network 1, there are three types of terminal devices: terminal device types 1, 2 and 3, which need to access the service 1, and the access technology 1, the access technology 2, and the access technology 3 support the service 1. The core & access network 1 determines to select, based on the capability of the terminal device, the access technology 1 for the terminal device type 1, the access technology 2 for the terminal device type 2, and the access technology 3 for the terminal device type 3.

Based on the foregoing understanding of a relationship between a service and an access technology, a solution is proposed in embodiments of the present application: information about an access technology and resource information corresponding to the access technology are carried by using a broadcast message, so that a terminal device selects a suitable access technology and a corresponding resource, and an operator may deploy a plurality of access technologies and a plurality of services. The information about the access technology may include an identity of the access technology. The resource may be a time-frequency resource on an air interface. The resource information includes at least one of resource location information and resource size information.

Figure 2:
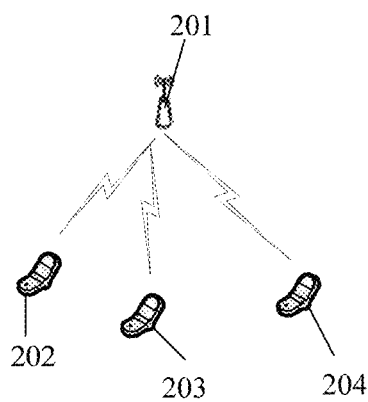
FIG. 2 is a schematic architecture diagram of a communications system to which an embodiment of the present application is applied.

FIG. 2 is a schematic architecture diagram of a communications system to which an embodiment of the present application is applied. As shown in FIG. 2, a communications system 200 may include a network device 201 and terminal devices 202 to 204, where the network device 201 and the terminal devices 202 to 204 are connected in a wireless, wired, or another manner. The network device can support a plurality of access technologies and provides a plurality of services for the terminal device by using the plurality of access technologies.

It should be understood that, the technical solutions of the embodiments of the present application may be applied to various communications systems, such as: a Global system for mobile communications ("GSM" for short) system, a Code Division Multiple Access ("CDMA" for short) system, a Wideband Code Division Multiple Access ("WCDMA" for short) system, a general packet radio service ("GPRS" for short) system, a Long Term Evolution ("LTE" for short) system, an LTE frequency division duplex ("FDD" for short) system, an LTE time division duplex ("TDD" for short) system, a Universal Mobile Telecommunications System ("UMTS" for short), a Worldwide Interoperability for Microwave Access ("WiMAX" for short) communications system, a future 5G communications system, or the like.

The present application describes the embodiments with reference to a terminal device. The terminal device may communicate with one or more core networks by using a radio access network (RAN), and the terminal device may be user equipment (UE for short), an access terminal, a user unit, a subscriber station, a mobile station, a mobile station, a remote station, a remote terminal, a mobile device, a user terminal, a terminal, a wireless communications device, a user agent, or a user apparatus. The access terminal may be a cellular phone, cordless telephone set, a Session Initiation Protocol (SIP for short) phone, a wireless local loop (WLL for short) station, a personal digital assistant (PDA for short), a handheld terminal with a wireless communication function, a computing device or another processing device connected to a wireless modem, an in-vehicle device, a wearable device, a terminal device in a future 5G network, or the like.

The present application describes the embodiments with reference to a network device. The network device may be a device configured to communicate with a terminal device. For example, the network device may be a base transceiver station ("BTS" for short) in a GSM system or in CDMA, may be a NodeB ("NB" for short) in a WCDMA system, or an evolved NodeB ("eNB" or "eNodeB" for short) in an LTE system. Alternatively, the network device may be a relay node, an access point, an in-vehicle device, a wearable device, a network-side device in a future 5G network, a network device in a future evolved PLMN network, or the like.

Figure 3:
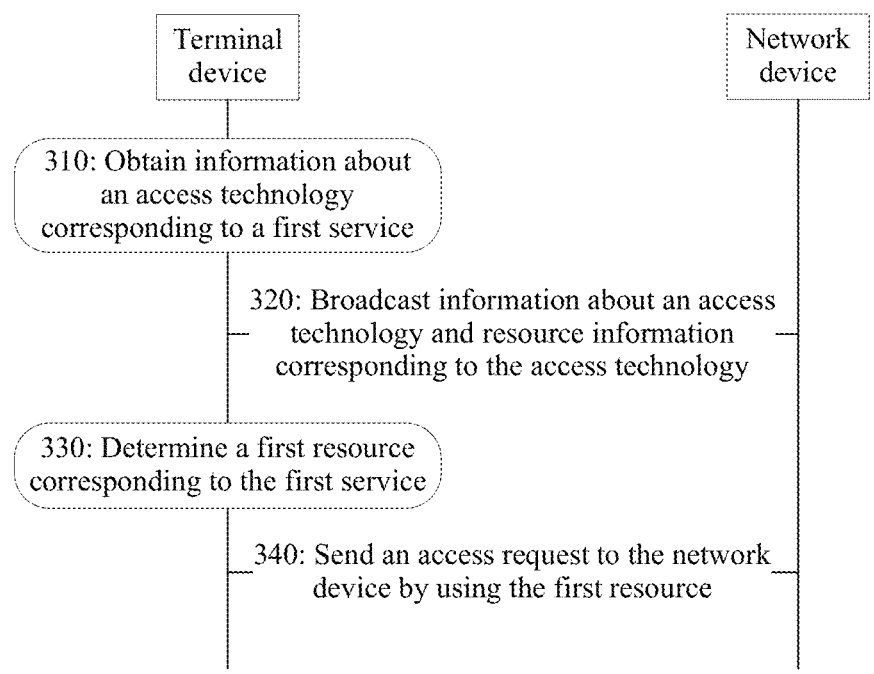
FIG. 3 is a schematic flowchart of a communication method according to an embodiment of the present application.

FIG. 3 is a schematic flowchart of a communication method according to an embodiment of the present application. The method may be applicable to the communications system in FIG. 2. For a relationship between a service and an access technology in this embodiment, refer to the foregoing descriptions.

The method 300 includes the following steps.

S310: A terminal device obtains information about an access technology corresponding to a first service.

The terminal device may obtain, during service subscription, the information about the access technology corresponding to the first service. The information about the access technology may include an identity of the access technology.

S320: A network device broadcasts information about an access technology and resource information corresponding to the access technology.

The broadcasting may be performed on a common broadcast channel.

The resource may be a time-frequency resource on an air interface. The resource information includes at least one of resource location information and resource size information.

S330: The terminal device receives the information about the access technology and the resource information corresponding to the access technology that are broadcast by the network device; and the terminal device determines, based on the obtained information about the access technology corresponding to the first service, and the information about the access technology and the resource information corresponding to the access technology that are broadcast by the network device, a first resource corresponding to the first service.

Optionally, when an access technology supporting a service required by the terminal device includes at least two access technologies, during service subscription, the terminal device may further obtain priorities of the access technologies corresponding to the service. When determining the first resource, the terminal device determines, based on the information about the access technology corresponding to the first service, the information about the access technology and the resource information corresponding to the access technology that are broadcast by the network device, and priority information of the access technologies corresponding to the first service, a resource corresponding to an access technology with a highest priority in the access technologies corresponding to the first service as the first resource.

S340: The terminal device sends an access request to the network device by using the first resource. The network device receives the access request that is sent by the terminal device on the first resource.

The terminal device may use a first access technology to send the access request to the network device on the first resource. The network device receives the access request that may be sent by the terminal device on the first resource by using the first technology. The first resource is a resource that is provided by the network device and that is used to carry a service supported by the first access technology. The first access technology is an access technology corresponding to the first service.

After accessing a network, the terminal device may further communicate with the network device on the first resource. The communication includes signaling interaction and/or data transmission.

Figure 4:
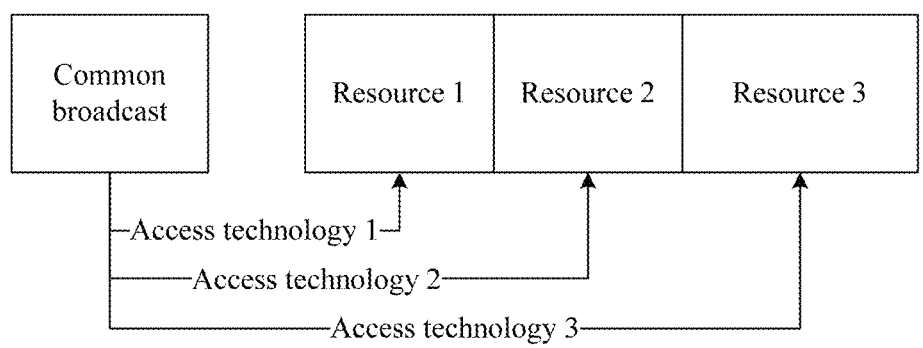
FIG. 4 is a schematic diagram of a relationship between an access technology and a corresponding resource according to this embodiment.

For a relationship between an access technology and a corresponding resource in this embodiment, refer to a schematic diagram shown in FIG. 4. In this embodiment of the present application, a network device uses a same resource to support all services that are based on an access technology. In other words, access technologies are in a one-to-one correspondence with resources corresponding to the access technologies. As shown in FIG. 4, for example, an access technology 1 is corresponding to a resource 1; an access technology 2 is corresponding to a resource 2; and an access technology 3 is corresponding to a resource 3. A network device broadcasts, on a common broadcast channel, identity information of access technologies 1 to 3 supported by the network device, and information about resources 1 to 3 respectively corresponding to the access technologies 1 to 3. Therefore, the terminal device may determine a resource of a required service based on a relationship between an access technology and a corresponding resource.

In this embodiment of the present application, the network device broadcasts the information about the access technology and the resource information corresponding to the access technology, so that the terminal device can receive a broadcast message, and obtain the information about the access technology and the resource information corresponding to the access technology. The terminal device determines, based on information about an access technology corresponding to a required service, a resource corresponding to the service, and accesses a network by using the resource. In this way, communication is implemented when a plurality of access technologies are used.

Figure 5:
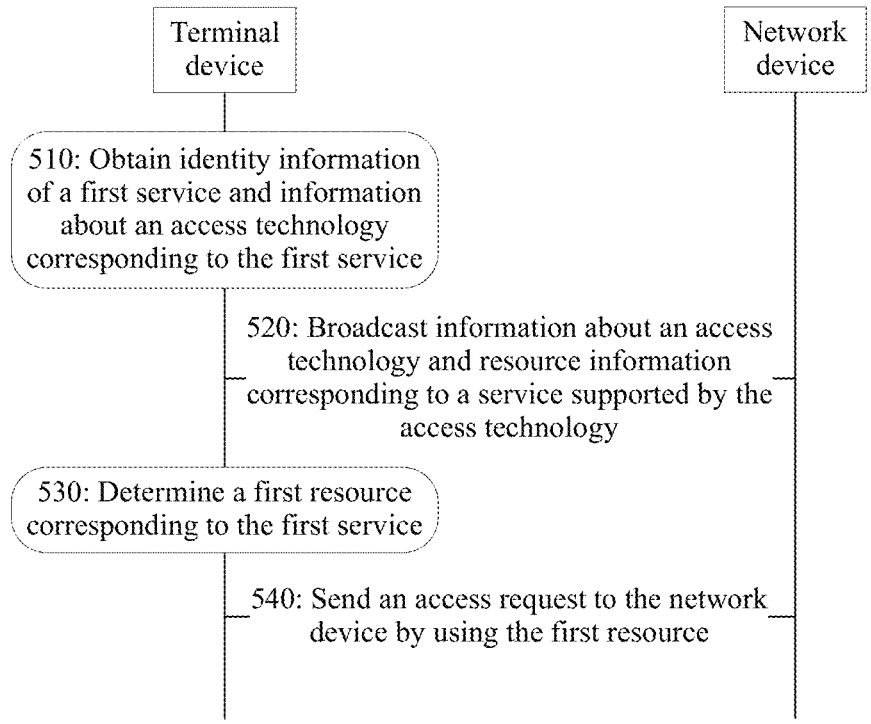
FIG. 5 is a schematic flowchart of another communication method according to an embodiment of the present application.

FIG. 5 is a schematic flowchart of a communication method according to another embodiment of the present application. The method may be applicable to the communications system in FIG. 2. For a relationship between a service and an access technology in this embodiment, refer to the foregoing descriptions. A scenario to which implementation of the present application is applicable is: A network device uses different resources to support different services that are based on an access technology.

The method 500 includes the following steps.

S510: A terminal device obtains identity information of a first service and information about an access technology corresponding to the first service.

The terminal device may obtain, during service subscription, the identity information of the first service and the information about the access technology corresponding to the first service. The information about the access technology may include an identity of the access technology.

S520: A network device broadcasts information about an access technology and resource information corresponding to a service supported by the access technology.

The broadcasting may be performed on a common broadcast channel.

S530: The terminal device receives the information about the access technology and the resource information corresponding to the service supported by the access technology that are broadcast by the network device. The terminal device matches the identity information of the first service and the information about the access technology corresponding to the first service that are obtained, with the information about the access technology and the resource information corresponding to the service supported by the access technology that are broadcast by the network device, to determine a first resource corresponding to the first service.

Optionally, when an access technology supporting a service required by the terminal device includes at least two access technologies, during service subscription, the terminal device may further obtain priorities of the access technologies corresponding to the service. When determining the first resource, the terminal device determines, based on the identity information of the first service, the information about the access technology corresponding to the first service, the information about the access technology and the resource information corresponding to the service supported by the access technology that are broadcast by the network device, and priority information of the access technologies corresponding to the first service, a resource corresponding to an access technology with a highest priority in the access technologies corresponding to the first service as the first resource.

S540: The terminal device sends an access request to the network device by using the first resource, and the network device receives the access request that is sent by the terminal device on the first resource.

The terminal device may use a first access technology to send the access request to the network device on the first resource, and the network device may receive, on the first resource by using the first technology, the access request sent by the terminal device. The first resource is a resource that is provided by the network device and that is used to carry a service supported by the first access technology. The first access technology is an access technology corresponding to the first service.

Figure 6:
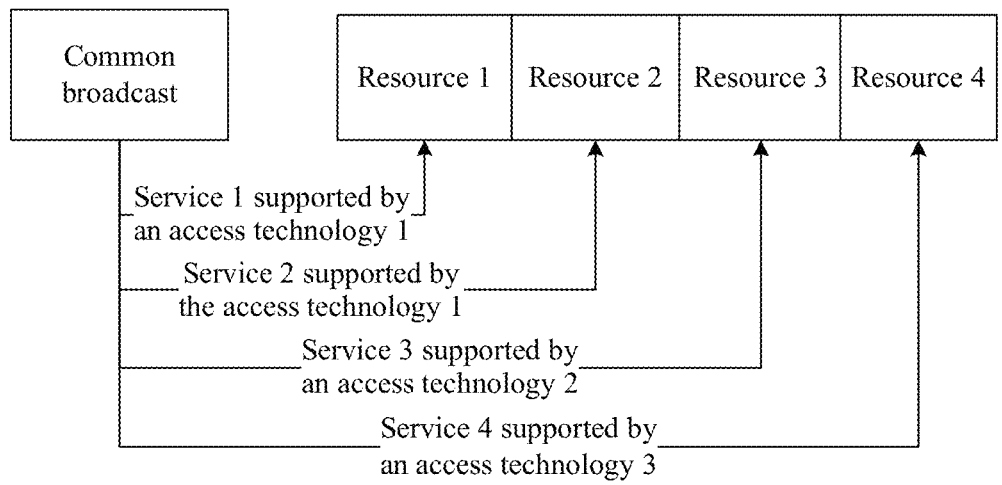
FIG. 6 is a schematic diagram of a relationship between another access technology and a corresponding resource according to this embodiment.

After accessing a network, the terminal device may further communicate with the network device on the first resource. The communication includes signaling interaction and/or data transmission. For a relationship between an access technology and a corresponding resource in this embodiment, refer to a schematic diagram shown in FIG. 6. In this embodiment of the present application, the network device uses different resources to support different services that are based on an access technology. The resource in this embodiment is a resource corresponding to a service supported by an access technology. As shown in FIG. 6, for example, a service 1 supported by an access technology 1 is corresponding to a resource 1, and a service 2 supported by the access technology 1 is corresponding to a resource 2. A service 3 supported by an access technology 2 is corresponding to a resource 3, and a service 4 supported by an access technology 3 is corresponding to a resource 4. A network device broadcasts, on a common broadcast channel, identity information of access technologies 1 to 3 supported by the network device, and resource information corresponding to services supported by the access technologies. Therefore, the terminal device may determine, based on information about the access technologies, a correspondence of service identity information and resources corresponding to the services supported by the access technologies, a resource of a required service. In this way, the terminal device accesses a network by using the resource, and communication is implemented when a plurality of access technologies are used.

Figure 7:
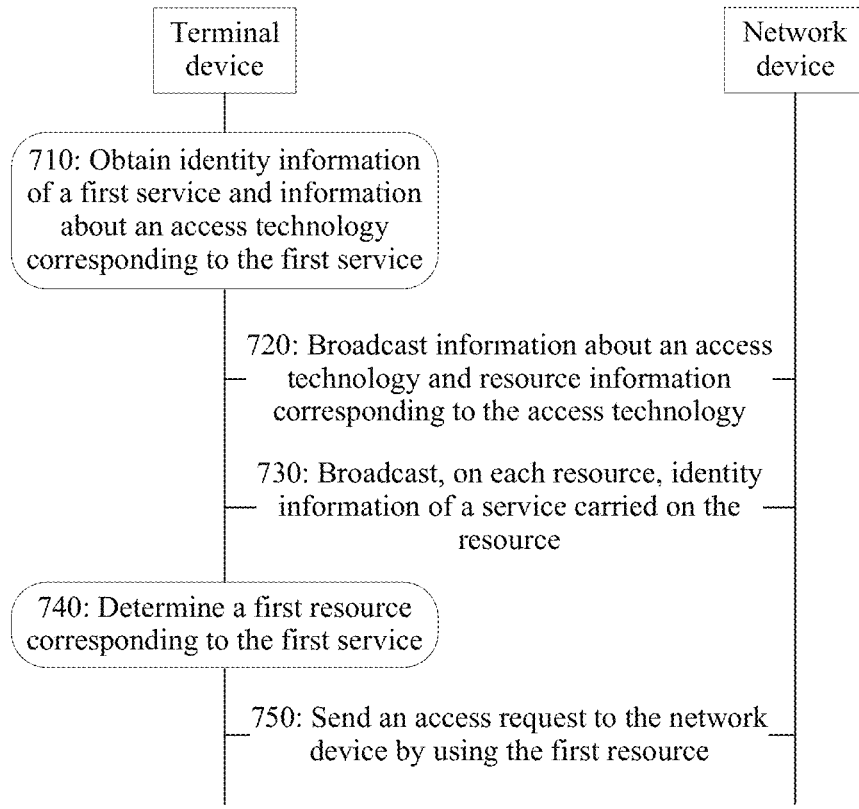
FIG. 7 is a schematic flowchart of another communication method according to an embodiment of the present application.

FIG. 7 is a schematic flowchart of a communication method according to another embodiment of the present application. The method may be applicable to the communications system in FIG. 2. For a relationship between a service and an access technology in this embodiment, refer to the foregoing descriptions. A scenario to which implementation of the present application is applicable is also: A network device uses different resources to support different services that are based on an access technology.

S710 is the same as step 510.

S720: A network device broadcasts information about an access technology and resource information corresponding to the access technology.

In this step, the network device may broadcast, on a common broadcast channel, the information about the access technology and the resource information corresponding to the access technology. In this embodiment of the present application, the network device uses different resources to support different services that are based on an access technology. If an access technology supports a plurality of services, the technology may be corresponding to a plurality of resources. For example, one corresponding resource is allocated for each service supported by the access technology, or one corresponding resource may be allocated for at least two services supported by the access technology. If an access technology is corresponding to a plurality of resources, resource information corresponding to the access technology includes information about the plurality of resources.

S730: The network device broadcasts, on a dedicated resource corresponding to the access technology, identity information of a service carried on the dedicated resource.

S740: The terminal device receives the information about the access technology and the resource information corresponding to the access technology that are broadcast by the network device; and the terminal device determines, based on the obtained information about the access technology corresponding to the first service, and the information about the access technology and the resource information corresponding to the access technology that are broadcast by the network device, a resource corresponding to the access technology corresponding to the first service; receives, on the resource corresponding to the access technology corresponding to the first service, service identity information broadcast by the network device; and determines, as the first resource, a resource used by the network device to send the identity information of the first service.

Optionally, when an access technology supporting a service required by the terminal device includes at least two access technologies, during service subscription, the terminal device may further obtain priorities of the access technologies corresponding to the first service. When determining the resource corresponding to the access technology corresponding to the first service, the terminal device determines, based on the information about the access technology corresponding to the first service, the priorities of the access technologies corresponding to the first service, and the information about the access technology and the resource information corresponding to the access technology that are broadcast by the network device, a resource corresponding to an access technology with a highest priority in the access technologies corresponding to the first service as resource information corresponding to the access technologies corresponding to the first service.

S750: The terminal device sends an access request to the network device by using the first resource, and the network device receives the access request that is sent by the terminal device on the first resource.

The terminal device may use a first access technology to send the access request to the network device on the first resource, and the network device may receive, by using the first access technology, the access request sent by the terminal device on the first resource. The first resource is a resource that is provided by the network device and that is used to carry the first service supported by the first access technology. The first access technology is an access technology corresponding to the first service.

After accessing a network, the terminal device may further communicate with the network device on the first resource. The communication includes signaling interaction and/or data transmission.

Figure 8:
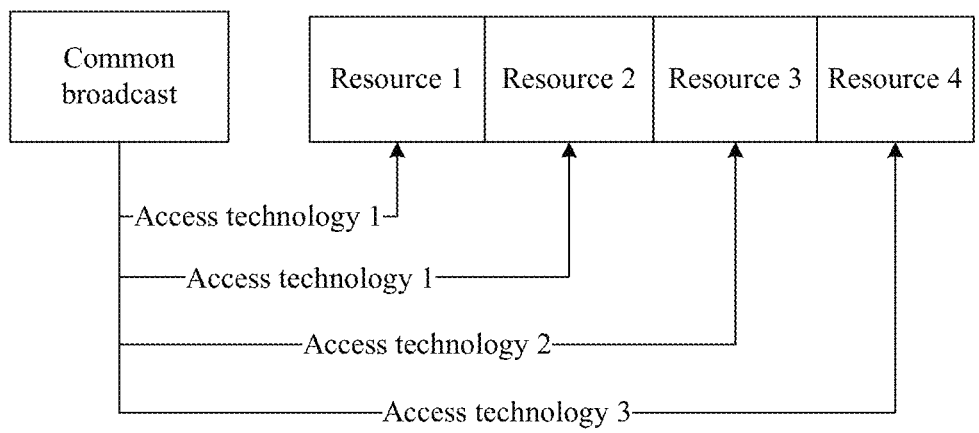
FIG. 8 is a schematic diagram of another relationship between an access technology and a corresponding resource according to this embodiment.

For a relationship between an access technology and a corresponding resource in this embodiment, refer to a schematic diagram shown in FIG. 8. In this embodiment of the present application, the network device uses different resources to support different services that are based on an access technology. As shown in FIG. 8, for example, an access technology 1 is corresponding to a resource 1 and a resource 2; an access technology 2 is corresponding to a resource 3; and an access technology 3 is corresponding to a resource 4. For example, the access technology 1 supports two services, which are respectively corresponding to two resources: the resource 1 and the resource 2, and the two resources are used for the services, respectively. The network device broadcasts, on a common broadcast channel, identity information of access technologies 1 to 3 supported by the network device, and resource information corresponding to the access technologies. Therefore, the terminal device may determine, based on a correspondence of information about the access technologies and resources corresponding to the access technologies, a resource corresponding to an access technology corresponding to a required service. In this way, the terminal device receives, on the resource corresponding to the access technology corresponding to the service, service identity information broadcast by the network device; and matches the received service identity information sent by the network device with identity information of a service required by the terminal device, to perform data communication on a matched network resource. Communication is implemented when a plurality of access technologies are used.

Figure 9:
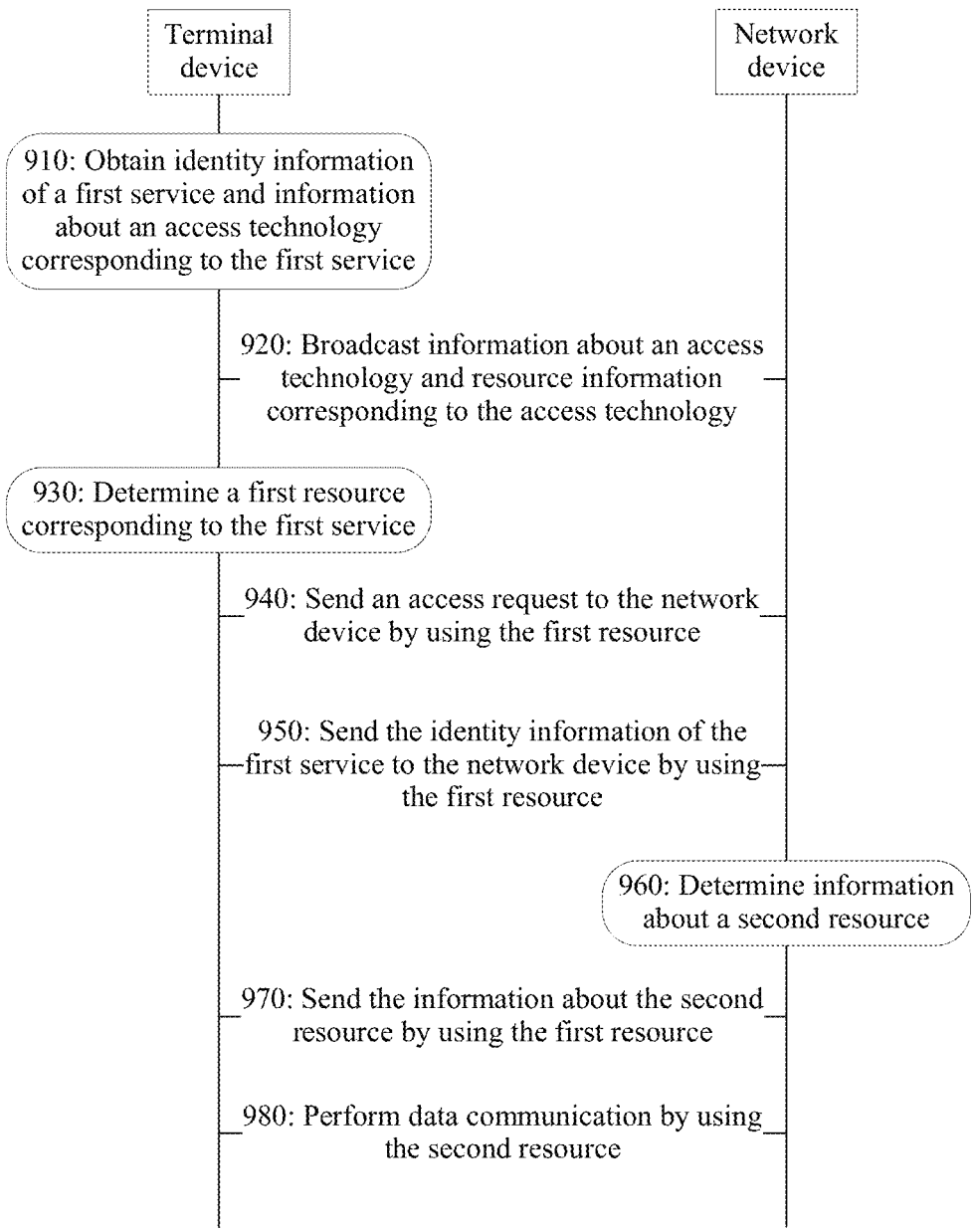
FIG. 9 is a schematic flowchart of another communication method according to an embodiment of the present application.

FIG. 9 is a schematic flowchart of a communication method according to another embodiment of the present application. The method may be applicable to the communications system in FIG. 2. For a relationship between a service and an access technology in this embodiment, refer to the foregoing descriptions. A scenario to which implementation of the present application is applicable is also: A network device uses different resources to support different services that are based on an access technology.

S910: A terminal device obtains identity information of a first service and information about an access technology corresponding to the first service.

The step is the same as step 510.

S920 is the same as step 320.

S930 is the same as step 330.

S940 is the same as step 340.

The terminal device may use the first access technology to send the access request to the network device on the first resource. The network device performs authentication and service authorization on the terminal device.

S950: The terminal device sends the identity information of the first service to the network device by using the first resource.

The terminal device may send, by using the first access technology, the identity information of the first service to the network device. The first access technology is an access technology corresponding to the first service.

In this embodiment of the present application, optionally, after completing the service authorization, the terminal device may add the identity information of the first service to a service authorization completion message that is to be sent to the network device.

S960: The network device receives the identity information of the first service sent by the terminal device. The network device determines information about a second resource based on a correspondence between a service and a resource and the identity information of the first service.

The network device may receive, by using the first access technology, the identity information of the first service sent by the terminal device. The network device may determine the information about the second resource based on a correspondence between a service and a resource, the identity information of the first service, information about an access technology used for sending the access request, and information about the first resource.

The second resource is used to transmit data of the first service.

S970: The network device sends, on the first resource, the information about the second resource to the user equipment.

The first resource is a resource that is provided by the network device and that is used to carry a service supported by the first access technology. The first access technology is an access technology corresponding to the first service.

S980: The user equipment communicates with the network device on the second resource. The user equipment may communicate with the network device on the second resource by using the first technology. The communication includes transmission of data of the first service and of related signaling. The transmission of related signaling includes transmission of a scheduling request related to data transmission and an uplink/downlink transmission resource indication.

Figure 10:
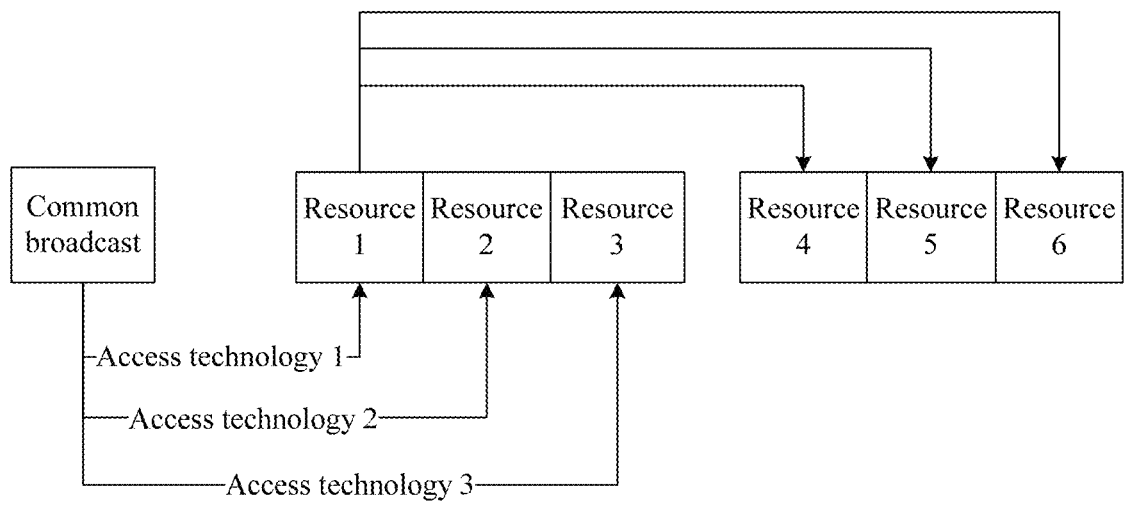
FIG. 10 is a schematic diagram of another relationship between an access technology and a corresponding resource according to this embodiment.

For a relationship between an access technology and a corresponding resource in this embodiment, refer to a schematic diagram shown in FIG. 10. In this embodiment of the present application, the network device uses different resources to support different services that are based on an access technology. As shown in FIG. 10, for example, an access technology 1 is corresponding to a resource 1; an access technology 2 is corresponding to a resource 2; and an access technology 3 is corresponding to a resource 3. The network device broadcasts, on a common broadcast channel, identity information of access technologies 1 to 3 supported by the network device, and resource information corresponding to the access technologies. Therefore, the terminal device may determine, based on a correspondence of information about the access technologies and resources corresponding to the access technologies, a resource corresponding to an access technology corresponding to a required service, for example, the resource 1. In this way, the terminal device sends, on the resource 1, the identity information of the first service to the network device. The network device may determine the information about the second resource based on a correspondence between a service and a resource, the identity information of the first service, information about an access technology used for sending the access request, and information about the first resource. That is, the network device determines the second resource from resources 4 to 6. On the second resource, the network device and the terminal device perform data communication. In this way, communication is implemented when a plurality of access technologies are used.

Figure 11:
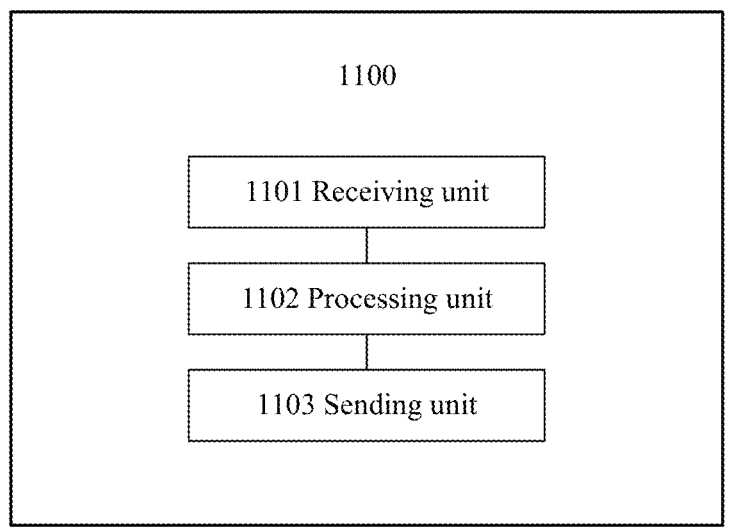
FIG. 11 is a schematic structural diagram of a terminal device according to an embodiment of the present application.

Based on a same concept, an embodiment of the present application provides a terminal device, configured to implement the method embodiment of the present application. For related content, refer to the descriptions of the method, and the content is not repeated herein. As shown in FIG. 11, a terminal device 1100 includes a receiving unit 1101, a processing unit 1102, and a sending unit 1103. The processing unit may be specifically a processor, the sending unit may be specifically a transmitter, and the receiving unit may be specifically a receiver.

The receiving unit is configured to receive information about an access technology and resource information corresponding to the access technology that are broadcast by the network device. The receiving unit receives, on a common broadcast channel, the information about the access technology and the resource information corresponding to the access technology that are broadcast by the network device.

The processing unit is configured to: obtain information about an access technology corresponding to a first service; and determine, based on the obtained information about the access technology corresponding to the first service, and the information about the access technology and the resource information corresponding to the access technology that are broadcast by the network device, a first resource corresponding to the first service, where the information about the access technology corresponding to the first service may be obtained by the terminal device during service subscription. The information about the access technology may be stored in a storage unit, and the processing unit obtains the information about the access technology from the storage unit. The information about the access technology may include an identity of the access technology.

The sending unit is configured to send an access request to the network device by using the first resource.

Optionally, when an access technology supporting a service required by the terminal device includes at least two access technologies, during service subscription, the terminal device may further obtain priorities of the access technologies corresponding to the service. Priority information of the access technologies may be stored in the storage unit. The processing unit obtains the priority information from the storage unit. When determining the first resource, the processing unit determines, based on the information about the access technology corresponding to the first service, the information about the access technology and the resource information corresponding to the access technology that are broadcast by the network device, and priority information of the access technologies corresponding to the first service, a resource corresponding to an access technology with a highest priority in the access technologies corresponding to the first service as the first resource.

Optionally, the resource information corresponding to the access technology includes resource information corresponding to a service supported by the access technology; and the processing unit is further configured to: obtain identity information of the first service; and match the information about the access technology corresponding to the first service and the identity information of the first service with the information about the access technology and the resource information corresponding to the service supported by the access technology that are broadcast by the network device, to determine the first resource. During service subscription, the terminal device may further obtain the identity information of the first service, where the identity information of the first service may be stored in the storage unit. The processing unit obtains the identity information from the storage unit.

Optionally, the processing unit is further configured to: obtain identity information of the first service; and determine, based on the information about the access technology corresponding to the first service, and the information about the access technology and the resource information corresponding to the access technology that are broadcast by the network device, a resource corresponding to the access technology corresponding to the first service. During service subscription, the terminal device may further obtain the identity information of the first service, where the identity information of the first service may be stored in the storage unit. The processing unit obtains priority information from the storage unit from the storage unit. The receiving unit is further configured to receive, on the determined resource corresponding to the access technology corresponding to the first service, service identity information broadcast by the network device, and the processing unit is configured to determine a resource used by the network device to send the identity information of the first service as the first resource.

Optionally, the sending unit is further configured to send identity information of the first service to the network device by using the first resource, and the receiving unit is further configured to receive, on the first resource, information that is about a second resource and is sent by the network device.

In this embodiment of the present application, the network device broadcasts the information about the access technology and the resource information corresponding to the access technology, so that the terminal device can receive a broadcast message, and obtain the information about the access technology and the resource information corresponding to the access technology. The terminal device determines, based on information about an access technology corresponding to a required service, a resource corresponding to the service, and accesses a network by using the resource. In this way, communication is implemented when a plurality of access technologies are used.

Figure 12:
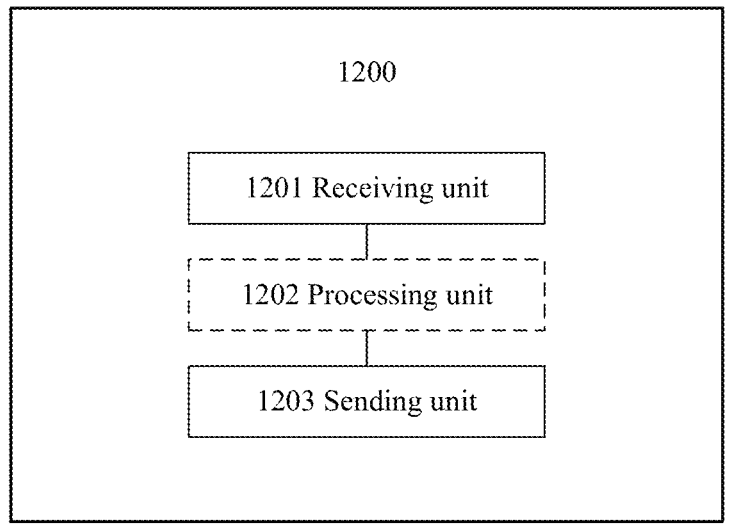
FIG. 12 is a schematic structural diagram of a network device according to an embodiment of the present application.

Based on a same concept, an embodiment of the present application provides a network device, configured to implement the method embodiment of the present application. For related content, refer to the descriptions of the method, and the content is not repeated herein. The network device may communicate with the terminal device provided in this embodiment of the present application. As shown in FIG. 12, a network device 1200 includes a receiving unit 1201 and a sending unit 1203. The sending unit may be specifically a transmitter, and the receiving unit may be specifically a receiver.

The sending unit is configured to broadcast information about an access technology and resource information corresponding to the access technology. The sending unit may broadcast, by using a common broadcast channel, the information about the access technology and the resource information corresponding to the access technology.

The receiving unit is configured to receive, on a first resource, an access request sent by a terminal device, where the first resource is a resource determined by the terminal device based on obtained information about an access technology corresponding to the first service, and the information about the access technology and the resource information corresponding to the access technology that are broadcast by the network device.

Optionally, the resource information corresponding to the access technology includes resource information corresponding to a service supported by the access technology, where the first resource is a resource determined by the terminal device by matching the information about the access technology corresponding to the first service and identity information of the first service with the information about the access technology and the resource information corresponding to the service supported by the access technology that are broadcast by the network device.

Optionally, the sending unit is further configured to broadcast, on a dedicated resource corresponding to the access technology, identity information of a service carried on the dedicated resource, and the first resource is a resource for sending identity information of the first service.

Optionally, the receiving unit is further configured to receive identity information of the first service sent by the terminal device, and the sending unit is further configured to send information about a second resource to the terminal device, where the second resource is used for communication between the network device and the terminal device.

Optionally, the network device further includes a processing unit. The processing unit may be specifically a processor.

The processing unit is configured to determine, based on a correspondence between a service and a resource, and identity information of the first service, the second resource.

In this embodiment of the present application, the network device broadcasts the information about the access technology and the resource information corresponding to the access technology, so that the terminal device can receive a broadcast message, and obtain the information about the access technology and the resource information corresponding to the access technology. The terminal device determines, based on information about an access technology corresponding to a required service, a resource corresponding to the service, and accesses a network by using the resource. In this way, communication is implemented when a plurality of access technologies are used.

Figure 13:
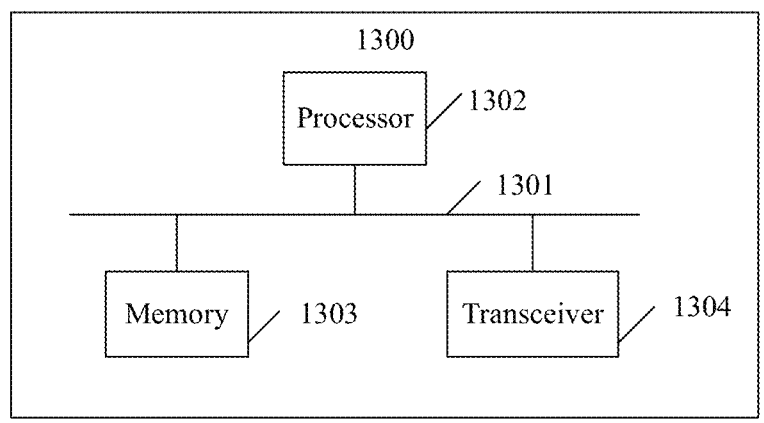
FIG. 13 is a schematic structural diagram of another terminal device according to an embodiment of the present application.

Based on a same technical concept, an embodiment of the present application provides a terminal device 1300, configured to implement the method in this embodiment of the present application. For related content, refer to the descriptions of the method, and the content is not repeated herein. Referring to FIG. 13, the device 1300 includes a bus 1301, and a processor 1302, a memory 1303, and a transceiver 1304 that are separately connected to the bus 1301.

The transceiver 1304 is configured to communicate with a network device.

The memory 1303 is configured to store an instruction.

The processor 1302 is configured to execute the instruction stored in the memory 1303, so as to perform the following steps when executing the instruction.

The processor 1302 obtains information about an access technology corresponding to a first service; receives, by using the transceiver 1304, information about an access technology and resource information corresponding to the access technology that are broadcast by the network device; determines, based on the obtained information about the access technology corresponding to the first service, and the information about the access technology and the resource information corresponding to the access technology that are broadcast by the network device, a first resource corresponding to the first service; and instructs the transceiver 1304 to send an access request to the network device by using the first resource.

The transceiver may be implemented by using two network elements: a transmitter and a receiver. The transmitter is configured to perform steps related to sending. The receiver is configured to perform steps related to receiving.

Optionally, in this embodiment of the present application, the resource information corresponding to the access technology includes resource information corresponding to a service supported by the access technology. The processor 1302 obtains identity information of the first service; and matches the information about the access technology corresponding to the first service and the identity information of the first service with the information about the access technology and the resource information corresponding to the service supported by the access technology that are broadcast by the network device, to determine the first resource.

Optionally, in this embodiment of the present application, the processor 1302 obtains identity information of the first service. The processor 1302 determines, based on the information about the access technology corresponding to the first service, and the information about the access technology and the resource information corresponding to the access technology that are broadcast by the network device, a resource corresponding to the access technology corresponding to the first service; instructs the transceiver 1304 to receive, on the determined resource corresponding to the access technology corresponding to the first service, service identity information broadcast by the network device; and determines, as the first resource, a resource used by the network device to send the identity information of the first service.

Optionally, in this embodiment of the present application, the processor 1302 instructs the transceiver 1304 to use the first access technology to communicate with the network device on the first resource.

Optionally, in this embodiment of the present application, the processor 1302 instructs the transceiver 1304 to send the identity information of the first service to the network device by using the first resource; the processor 1302 instructs the transceiver 1304 to receive, on the first resource, information that is about a second resource and is sent by the network device; and the processor 1302 instructs the transceiver 1304 to communicate with the network device on the second resource.

Optionally, in this embodiment of the present application, the second resource is determined by the network device based on the identity information of the first service and a correspondence between a service and a resource.

In this embodiment of the present application, the network device broadcasts the information about the access technology and the resource information corresponding to the access technology, so that the terminal device can receive a broadcast message, and obtain the information about the access technology and the resource information corresponding to the access technology. The terminal device determines, based on information about an access technology corresponding to a required service, a resource corresponding to the service, and accesses a network by using the resource. In this way, communication is implemented when a plurality of access technologies are used.

Figure 14:
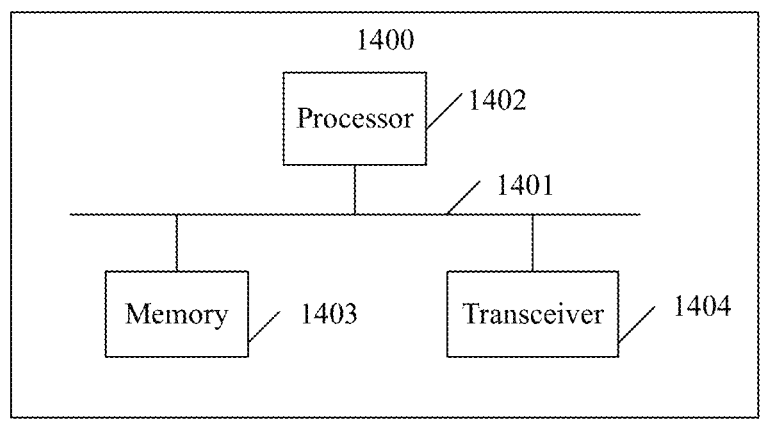
FIG. 14 is a schematic structural diagram of another network device according to an embodiment of the present application.

Based on a same technical concept, an embodiment of the present application provides a network device 1400, configured to implement the method in this embodiment of the present application. For related content, refer to the descriptions of the method, and the content is not repeated herein. Referring to FIG. 14, the device 1400 includes a bus 1401, and a processor 1402, a memory 1403, and a transceiver 1404 that are separately connected to the bus 1401.

The transceiver 1404 is configured to communicate with a network device.

The memory 1403 is configured to store an instruction.

The processor 1402 is configured to execute the instruction stored in the memory 1403, so as to perform the following steps when executing the instruction.

The processor 1402 broadcasts information about an access technology and resource information corresponding to the access technology; and receives, on a first resource, an access request sent by a terminal device, where the first resource is a resource determined by the terminal device based on obtained information about an access technology corresponding to the first service, and the information about the access technology and the resource information corresponding to the access technology that are broadcast by the network device.

The transceiver may be implemented by using two network elements: a transmitter and a receiver. The transmitter is configured to perform steps related to sending. The receiver is configured to perform steps related to receiving.

Optionally, in this embodiment of the present application, the resource information corresponding to the access technology includes resource information corresponding to a service supported by the access technology, where the first resource is a resource determined by the terminal device by matching the information about the access technology corresponding to the first service and identity information of the first service with the information about the access technology and the resource information corresponding to the service supported by the access technology that are broadcast by the network device.

Optionally, in this embodiment of the present application, the processor 1402 instructs the transceiver 1404 to separately broadcast, on a dedicated resource corresponding to an access technology, identity information of a service carried on the dedicated resource, where the first resource is a resource for sending the identity information of the first service.

Optionally, in this embodiment of the present application, the processor 1402 instructs the transceiver 1404 to communicate with the terminal device on the first resource.

Optionally, in this embodiment of the present application, the processor 1402 instructs the transceiver 1404 to communicate with the terminal device on the first resource.

Optionally, in this embodiment of the present application, the processor 1402 instructs the transceiver 1404 to receive the identity information of the first service sent by the terminal device; the processor 1402 instructs the transceiver 1404 to send information about a second resource to the terminal device; and the processor 1402 instructs the transceiver 1404 to communicate with the terminal device on the second resource.

In this embodiment of the present application, the network device broadcasts the information about the access technology and the resource information corresponding to the access technology, so that the terminal device can receive a broadcast message, and obtain the information about the access technology and the resource information corresponding to the access technology. The terminal device determines, based on information about an access technology corresponding to a required service, a resource corresponding to the service, and accesses a network by using the resource. In this way, communication is implemented when a plurality of access technologies are used.

It should be noted that the foregoing processor may be a processing unit, or may be a catch-all term of a plurality of processing units. For example, the processor may be a central processing unit (CPU), may be an application-specific integrated circuit (ASIC for short), or may be configured as one or more integrated circuits for implementing this embodiment of the present application, for example, one or more microprocessors (digital signal processor, DSP), or one or more field programmable gate arrays (FPGA for short).

The memory may be a storage apparatus or may be a catch-all term of a plurality of storage elements, and is configured to store executable program code or a parameter, data, and the like that are required for running a residential access network device or a terminal. The memory may include a random access memory (random access memory, RAM for short) or may include a non-volatile memory (non-volatile memory, NVM for short), such as a magnetic disk storage or a flash memory (Flash).

The bus may be an industry standard architecture (Industry Standard Architecture, ISA for short) bus, a peripheral component interconnect (Peripheral Component, PCI for short) bus or an extended industry standard architecture (Extended Industry Standard Architecture, EISA for short) bus, and the like. The bus may be divided into an address bus, a data bus, a control bus, or the like. For ease of denotation, only one line is used in the figure for representing the bus. However, this does not mean that there is only one bus or a bus of one type.

A person skilled in the art should understand that the embodiments of the present application may be provided as a method, a system, or a computer program product. Therefore, the present application may use a form of hardware-only embodiments, software-only embodiments, or embodiments with a combination of software and hardware. In addition, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus configured to implement a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

Although some embodiments of the present application have been described, a person skilled in the art can make changes and modifications to these embodiments once they learn the basic inventive concept. Therefore, the appended claims are intended to be construed as to cover the preferred embodiments and all changes and modifications falling within the scope of the present application.

Obviously, a person skilled in the art can make various modifications and variations to the present application without departing from the scope of the present application. The present application is intended to cover these modifications and variations provided that they fall within the scope of protection defined by the following claims and their equivalent technologies.

What is claimed is:

1. A communication method, comprising:
obtaining, by a terminal device, information about an access technology corresponding to a first service;
obtaining, by the terminal device, identity information of the first service;
receiving, by the terminal device, information about an access technology and resource information corresponding to the access technology that are broadcast by a network device, wherein the resource information corresponding to the access technology comprises resource information corresponding to a service supported by the access technology;
determining, by the terminal device based on the obtained information about the access technology corresponding to the first service, and the information about the access technology and the resource information corresponding to the access technology that are broadcast by the network device, a first resource corresponding to the first service, wherein the determining the first resource includes matching, by the terminal device, the information about the access technology corresponding to the first service and the identity information of the first service with the information about the access technology and the resource information corresponding to the service supported by the access technology that are broadcast by the network device, to determine the first resource;
sending, by the terminal device, an access request to the network device by using the first resource;
sending, by the terminal device, the identity information of the first service to the network device by using the first resource; and
receiving, by the terminal device on the first resource, information that is about a second resource and is sent by the network device.

2. The method according to claim 1, further comprising: communicating, by the terminal device with the network device on the second resource.

3. The method according to claim 2, wherein the second resource is determined by the network device based on the identity information of the first service and a correspondence between a service and a resource.

4. A communication method, comprising:
broadcasting, by a network device, information about an access technology and resource information corresponding to the access technology;
receiving, by the network device on a first resource, an access request sent by a terminal device, wherein the first resource is a resource determined by the terminal device based on obtained information about an access technology corresponding to a first service, and the information about the access technology and the resource information corresponding to the access technology that are broadcast by the network device, wherein the resource information corresponding to the access technology comprises resource information corresponding to a service supported by the access technology, the first resource being a resource determined by the terminal device by matching the information about the access technology corresponding to the first service and identity information of the first service with the information about the access technology and the resource information corresponding to the service supported by the access technology that are broadcast by the network device;
receiving, by the network device, the identity information of the first service sent by the terminal device; and
sending, by the network device, information about a second resource to the terminal device.

5. The method according to claim 4, further comprising:
broadcasting, by the network device on a dedicated resource corresponding to the access technology, identity information of a service carried on the dedicated resource, wherein
the first resource is a resource for sending identity information of the first service.

6. The method according to claim 4, further comprising, communicating, by the network device with the terminal device on the second resource.

7. The method according to claim 6, further comprising: determining, by the network device, the second resource based on the identity information of the first service and a correspondence between a service and a resource.

8. A terminal device, comprising:
a receiving unit, configured to receive information about an access technology and resource information corresponding to the access technology that are broadcast by a network device, wherein the resource information corresponding to the access technology comprises resource information corresponding to a service supported by the access technology;
a processing unit, configured to: obtain information about an access technology corresponding to a first service, obtain identity information of the first service, and determine, based on the obtained information about the access technology corresponding to the first service, and the information about the access technology and the resource information corresponding to the access technology that are broadcast by the network device, a first resource corresponding to the first service, wherein the determining the first resource includes matching the information about the access technology corresponding to the first service and the identity information of the first service with the information about the access technology and the resource information corresponding to the service supported by the access technology that are broadcast by the network device, to determine the first resource; and
a sending unit, configured to send an access request to the network device by using the first resource, wherein the sending unit is further configured to send the identity information of the first service to the network device by using the first resource, and wherein the receiving unit is further configured to receive, on the first resource, information that is about a second resource and is sent by the network device.

9. The terminal device according to claim 8, wherein the second resource is used for communication between the terminal device and the network device.

10. The terminal device according to claim 9, wherein the second resource is determined by the network device based on the identity information of the first service and a correspondence between a service and a resource.

11. A network device, comprising:
a sending unit, configured to broadcast information about an access technology and resource information corresponding to the access technology; and
a receiving unit, configured to receive, on a first resource, an access request sent by a terminal device, wherein the first resource is a resource determined by the terminal device based on obtained information about an access technology corresponding to the first service, and the information about the access technology and the resource information corresponding to the access technology that are broadcast by the network device, wherein the resource information corresponding to the access technology comprises resource information corresponding to a service supported by the access technology, the first resource being a resource determined by the terminal device by matching the information about the access technology corresponding to the first service and identity information of the first service with the information about the access technology and the resource information corresponding to the service supported by the access technology that are broadcast by the network device, wherein the receiving unit is further configured to receive the identity information of the first service sent by the terminal device and the sending unit is further configured to send information about a second resource to the terminal device.

12. The network device according to claim 11, wherein the sending unit is further configured to broadcast on a dedicated resource corresponding to the access technology, identity information of a service carried on the dedicated resource, and
the first resource is a resource for sending identity information of the first service.

13. The network device according to claim 11, wherein the second resource is used for communication between the network device and the terminal device.

14. The network device according to claim 13, further comprising a processing unit, configured to determine the second resource based on the identity information of the first service and a correspondence between a service and a resource.

* * * * *